(12) United States Patent
Lee

(10) Patent No.: US 7,389,110 B2
(45) Date of Patent: Jun. 17, 2008

(54) MOBILE COMMUNICATION SYSTEM AND METHOD FOR IMPLEMENTING HANDOFF

(75) Inventor: Sung-Won Lee, Sungnam-shi (KR)

(73) Assignee: Samsung Electronics Co., Ltd (KR)

( * ) Notice: Subject to any disclaimer, the term of this patent is extended or adjusted under 35 U.S.C. 154(b) by 287 days.

(21) Appl. No.: 10/281,745

(22) Filed: Oct. 28, 2002

(65) Prior Publication Data

US 2003/0104815 A1  Jun. 5, 2003

(30) Foreign Application Priority Data

Oct. 26, 2001 (KR) ................ 10-2001-0066477

(51) Int. Cl.
*H04Q 7/20* (2006.01)
(52) U.S. Cl. ............ 455/436; 455/438; 455/439
(58) Field of Classification Search ........ 455/436–442, 455/445; 370/329–331, 475
See application file for complete search history.

(56) References Cited

U.S. PATENT DOCUMENTS 5,471,644 A * 11/1995 Schatz et al. ............... 455/436
6,216,003 B1 * 4/2001 Hamajima et al. .......... 455/437
6,473,413 B1 * 10/2002 Chiou et al. ................ 370/331
6,542,744 B1 * 4/2003 Lin ............................ 455/437
6,834,050 B1 * 12/2004 Madour et al. ............. 370/331
2001/0036830 A1 * 11/2001 Wu et al. .................... 455/436
2002/0114293 A1 * 8/2002 Madour et al. ............. 370/329

* cited by examiner

*Primary Examiner*—Joseph Feild
*Assistant Examiner*—Phuoc Doan
(74) *Attorney, Agent, or Firm*—The Farrell Law Firm, PC

(57) ABSTRACT

A handoff implementing method in a mobile communication system having a planar structure, in which at least two BSCs are connected to at least two BTSs through a RAN. An MT transmits a first Handoff Request message containing its information and information about its anchor BSC to a target BTS when it moves to a handoff zone. Upon receipt of the first Handoff Request message, the target BTS transmits a second Handoff Request message containing the MT information and its information to the anchor BSC. Upon receipt of the second Handoff Request message, the anchor BSC transmits a traffic signal directed to the MT to the target BTS.

9 Claims, 14 Drawing Sheets

MOBILE COMMUNICATION SYSTEM AND METHOD FOR IMPLEMENTING HANDOFF

PRIORITY

This application claims priority to an application entitled "Mobile Communication System and Method for Implementing Handoff" filed in the Korean Industrial Property Office on Oct. 26, 2001 and assigned Serial No. 2001-66477, the contents of which are hereby incorporated by reference.

BACKGROUND OF THE INVENTION

1. Field of the Invention

The present invention relates generally to a handoff in a BTS (Base Transceiver System) in a mobile communication system, and in particular, to a method of implementing a handoff in a mobile communication system having a planar structure.

2. Description of the Related Art

In general, an MT (Mobile Terminal) is connected to a BTS via a radio link and the BTS is connected to its higher layers via wired links in a mobile communication system. Existing mobile communication systems are connected to the Internet to deliver information on a larger scale, as illustrated in FIGS. 1A and 1B.

FIG. 1A illustrates the network configuration of a conventional mobile communication system. Referring to FIG. 1A, a PDSN (Packet Data Serving Node) or AGW (Access Gateway) 20 interconnected with an Internet 10 is located in the highest layer. A RAN-CN (Radio Access Network-Core Network) 30 is connected to the PDSN/AGW 20. BTSs (Base Transceiver Systems) 60-1 to 60-m are connected to a BSC 40-1 through a RAN-Access Network 50. Each BTS is connected to a BSC in its higher layer and BSCs are matched with BTSs in a 1-to-N correspondence. Hence, one BTS cannot be connected to two or more BSCs simultaneously.

FIG. 1B illustrates a network configuration under consideration for the future generation mobile communication system. Referring to FIG. 1B, all components are connected over a single network. Also in this mobile communication system, BSCs are matched with BTSs logically in a 1-to-N correspondence. From a physical aspect, the system has a planar structure but a hierarchical structure in effect like the system illustrated in FIG. 1. That is, each BSC is connected to at least two BTSs.

FIG. 2 illustrates the logical hierarchical network structure of the mobile communication having a planar structure. In this network, an inter-BSC handoff may be implemented in the same manner as in the above-described hierarchical network structure. This will be described with reference to FIG. 3.

FIGS. 3A, 3B and 3C depict a handoff in the mobile communication system having a planar structure from an outward perspective but a hierarchical structure from an operational perspective.

Referring to FIG. 3A, an MT 80 is communicating with a source BTS #c 60-3. As the MT 80 roams, a handoff may occur. Referring to FIG. 3B, a handoff occurs when the MT 80 moves to a target BTS #b 60-2. At a conventional hierarchical handoff, a BTS is fixed to a specific higher-layer BSC. Therefore, the target BTS #b 60-2 is connected to a BSC #n 40-n which is in turn connected to the anchor BSC #1 40-1 of the MT 80 via a RAN 70.

The above hierarchical handoff will be described with reference to FIG. 4. FIG. 4 is a diagram illustrating a signal flow for performing an inter-BSC handoff in the conventional mobile communication network having a logically hierarchical structure.

Referring to FIG. 4, the MT 80 transmits a Handoff Request message containing its ID (i.e. its temporary number assigned for communication or its telephone number) to the target BTS #b 60-2 in step 100. In step 110, the target BTS #b 60-2 transmits a Handoff Request message containing the IDs of the MT 80 and the target BTS #b 60-2 to the target BSC #n 40-n. The target BSC #n 40-n transmits a Handoff Request message containing the IDs of the MT 80 and the target BSC #n 40-n to the anchor BSC#1 40-1 in step 120. Then the anchor BSC establishes connections to other devices connected to the MT 80 in step 130 and exchanges traffic with the MT 80 in step 140.

As illustrated in FIG. 3B, two paths are established for the MT 80, from the MT 80 to the anchor BSC #1 40-1 via the source BTS #c 60-3 and from the MT 80 to the target BSC #n 40-n through the target BTS #b 60-2. The target BSC #n 40-n is connected to the anchor BSC #1 40-1. Since the two BSCs operate together for the MT 80, unnecessary load is imposed on them. Moreover, the target BTS #b 60-2 transmits a signal to the anchor BSC #1 40-1 via the target BSC #n 40-n, which adds to the load of the RAN 70. As a result, time required for the handoff is prolonged.

When the handoff is completed as illustrated in FIG. 3C, the target BSC #n 40-n transmits a signal to the MT 80 via the target BTS #b 60-2. Since the target BTS #b 60-2 is connected to the target BSC #n 40-n which transmits traffic via the anchor BSC #n 40-1, the capacity load of the RAN 70 is increased and a data flow is delayed. Consequently, the inter-BSC handoff decreases the capacity of the RAN 70 and increases a transmission delay in the network of a planar structure.

SUMMARY OF THE INVENTION

It is, therefore, an object of the present invention to provide an inter-BSC handoff method suitable for a network having a planar structure.

It is another object of the present invention to provide a method of reducing load during an inter-BSC handoff in a network having a planar structure.

It is a further object of the present invention to provide a method of reducing a data delay during an inter-BSC handoff in a network having a planar structure.

To achieve the above and other objects, there is a handoff implementing method in a mobile communication system having a planar structure, in which at least two BSCs are connected to at least two BTSs through a RAN.

According to an aspect of the present invention, an MT transmits a first Handoff Request message containing its information and information about its anchor BSC to a target BTS when it moves to a handoff zone. Upon receipt of the first Handoff Request message, the target BTS transmits a second Handoff Request message containing the MT information and its information to the anchor BSC. Upon receipt of the second Handoff Request message, the anchor BSC transmits a traffic signal directed to the MT to the target BTS.

According to another aspect of the present invention, an MT transmits to a target BTS a first Handoff Request message containing its information when the MT moves to a handoff zone. Upon receipt of the first Handoff Request message, the target BTS detects the anchor BSC of the MT from the database, and transmits a second Handoff Request message containing its information and the MT information to the anchor BSC. Upon receipt of the second Handoff Request message, the anchor BSC transmits a traffic signal directed to the MT to the target BTS.

According to a further aspect of the present invention, an MT transmits a first Handoff Request message containing its information to a target BTS when the MT moves to a handoff zone. Upon receipt of the first Handoff Request message, the target BTS broadcasts a Search Request message for searching for the anchor BSC of the MT over the RAN, and upon receipt of a Search Response message indicating the anchor BSC over the RAN, it transmits a second Handoff Request message containing its information and the MT information to the anchor BSC. Upon receipt of the second Handoff Request message, the anchor BSC transmits a traffic signal directed to the MT to the target BTS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

According to the present invention, BSCs are matched with BTSs not in a 1-to-N correspondence but in an N-to-M correspondence. With such a correspondence between BSCs and BTSs, the capacity load of a RAN, a handoff delay, and a traffic transmission/reception delay are reduced. The following description is made with the appreciation that at least one BSC and at least two BTSs are connected to a RAN.

Figure 1A:
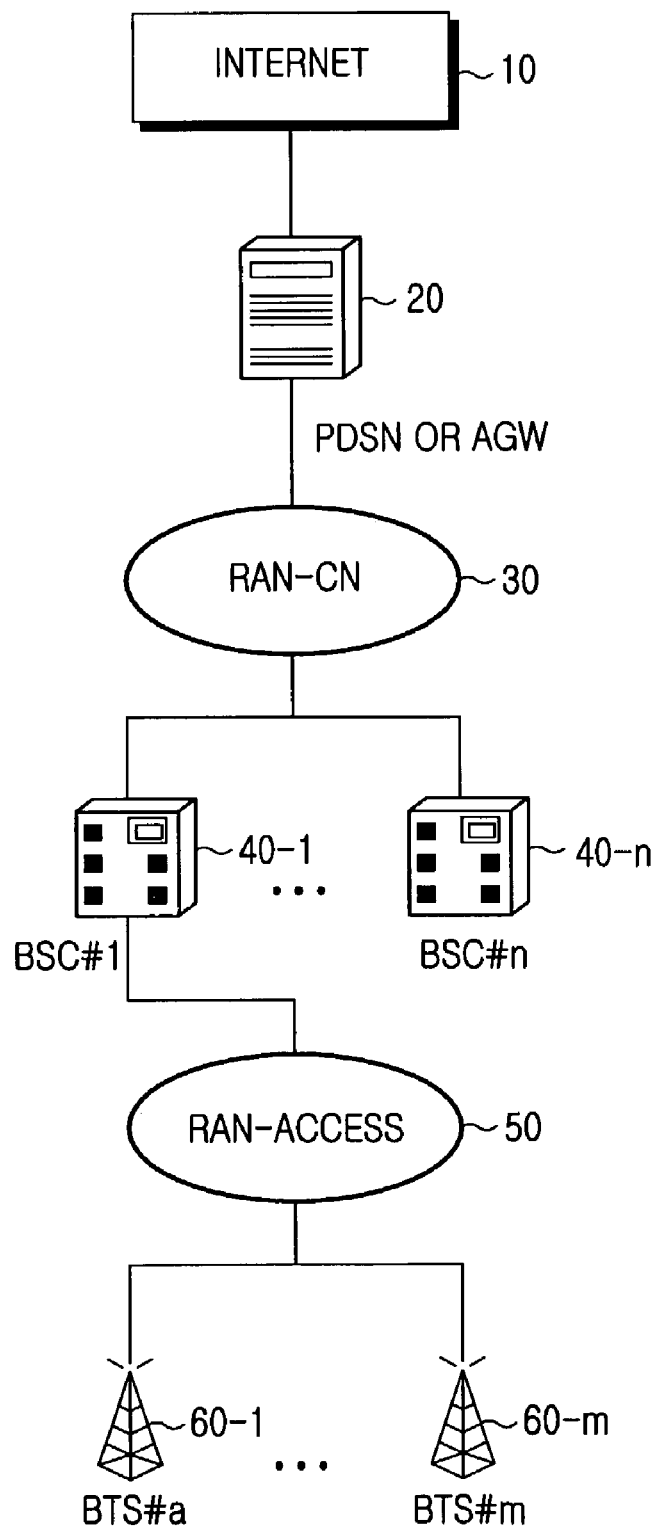
FIG. 1A illustrates the network structure of a conventional mobile communication system.
Figure 1B:
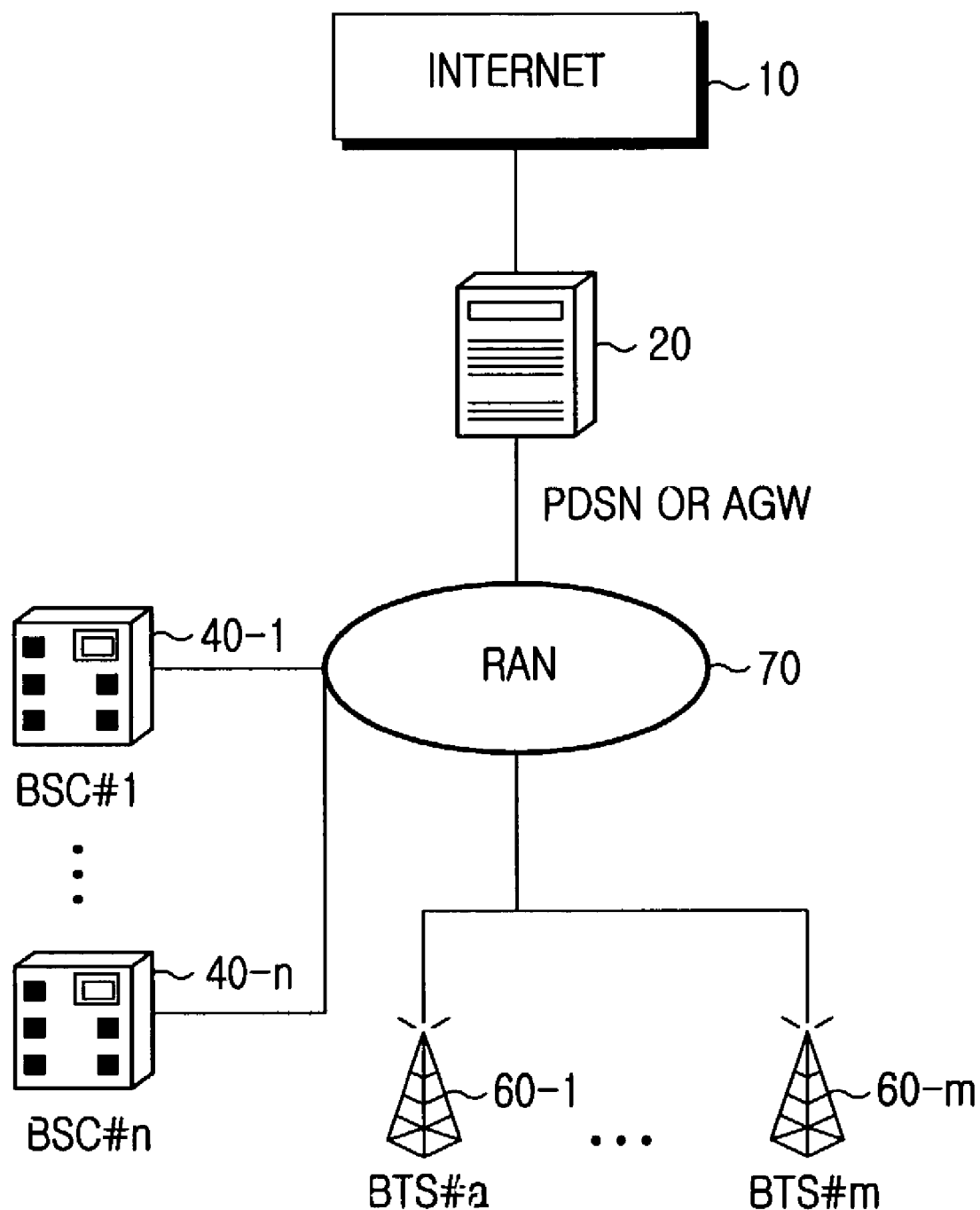
FIG. 1B illustrates a network structure under consideration for the future generation mobile communication system.
Figure 2:
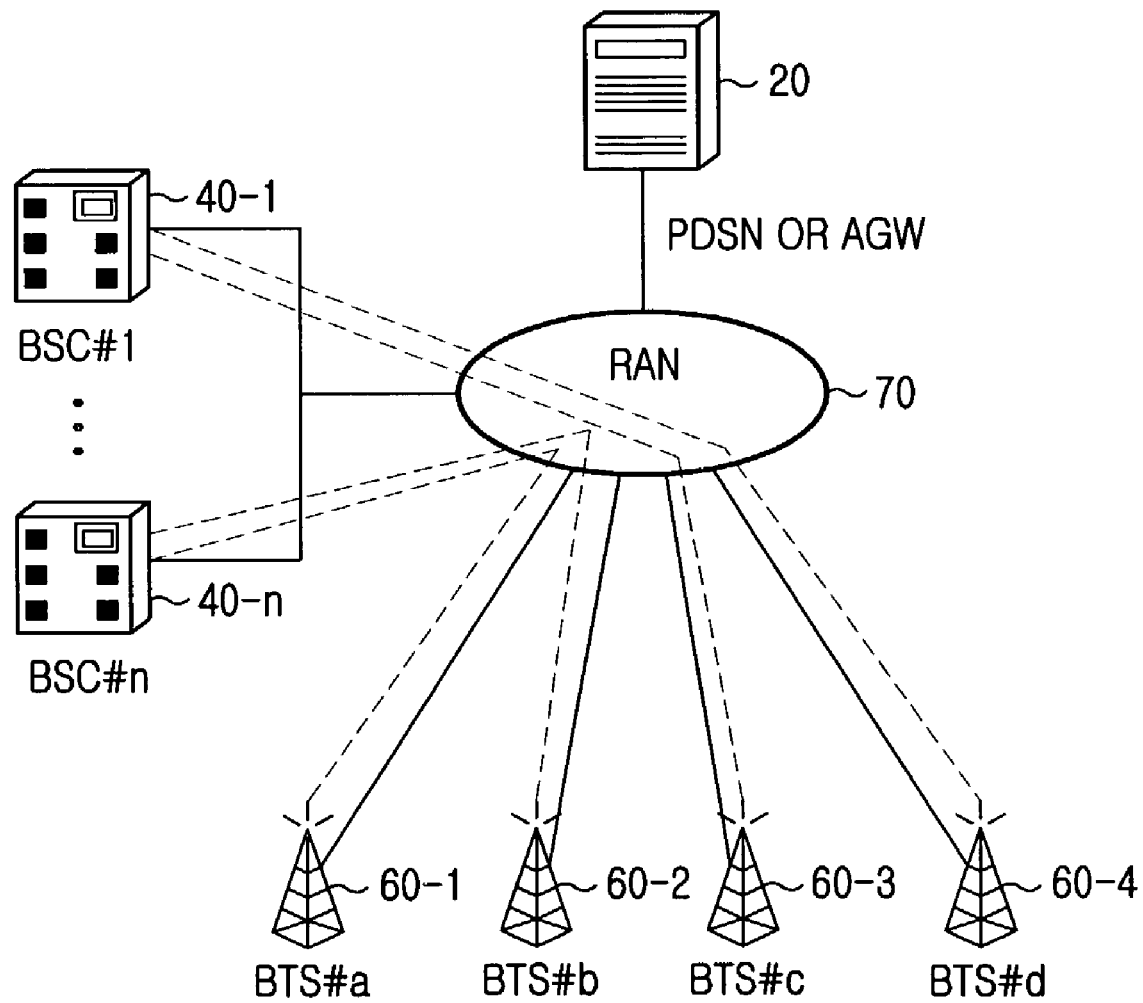
FIG. 2 illustrates the logical hierarchical network structure of a mobile communication system having a planar structure.
Figure 3:
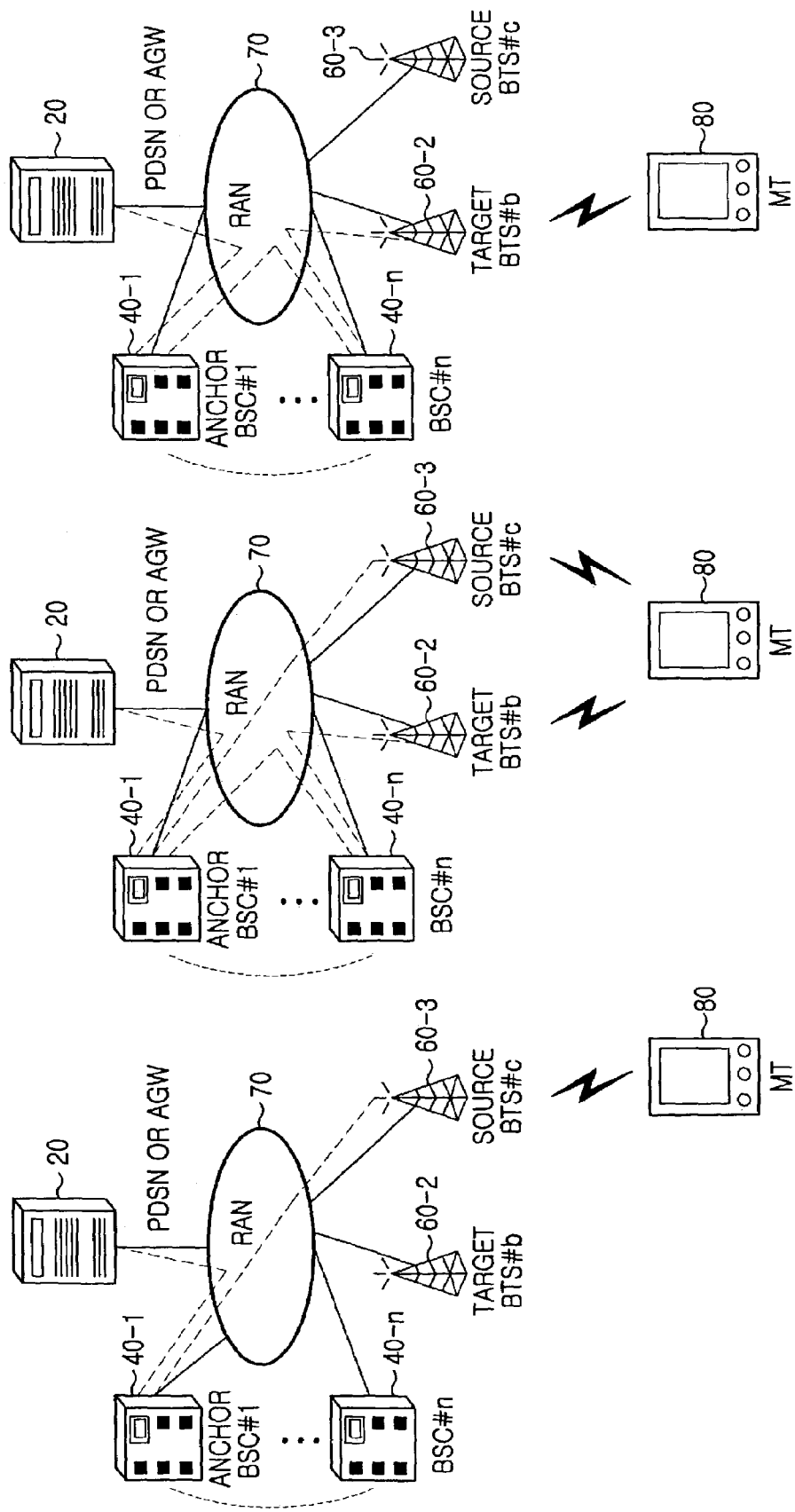
FIGS. 3A, 3B and 3C illustrate a handoff in a the conventional mobile communication system having a planar structure from an outward perspective but having a hierarchical structure in an operational perspective.
Figure 4:
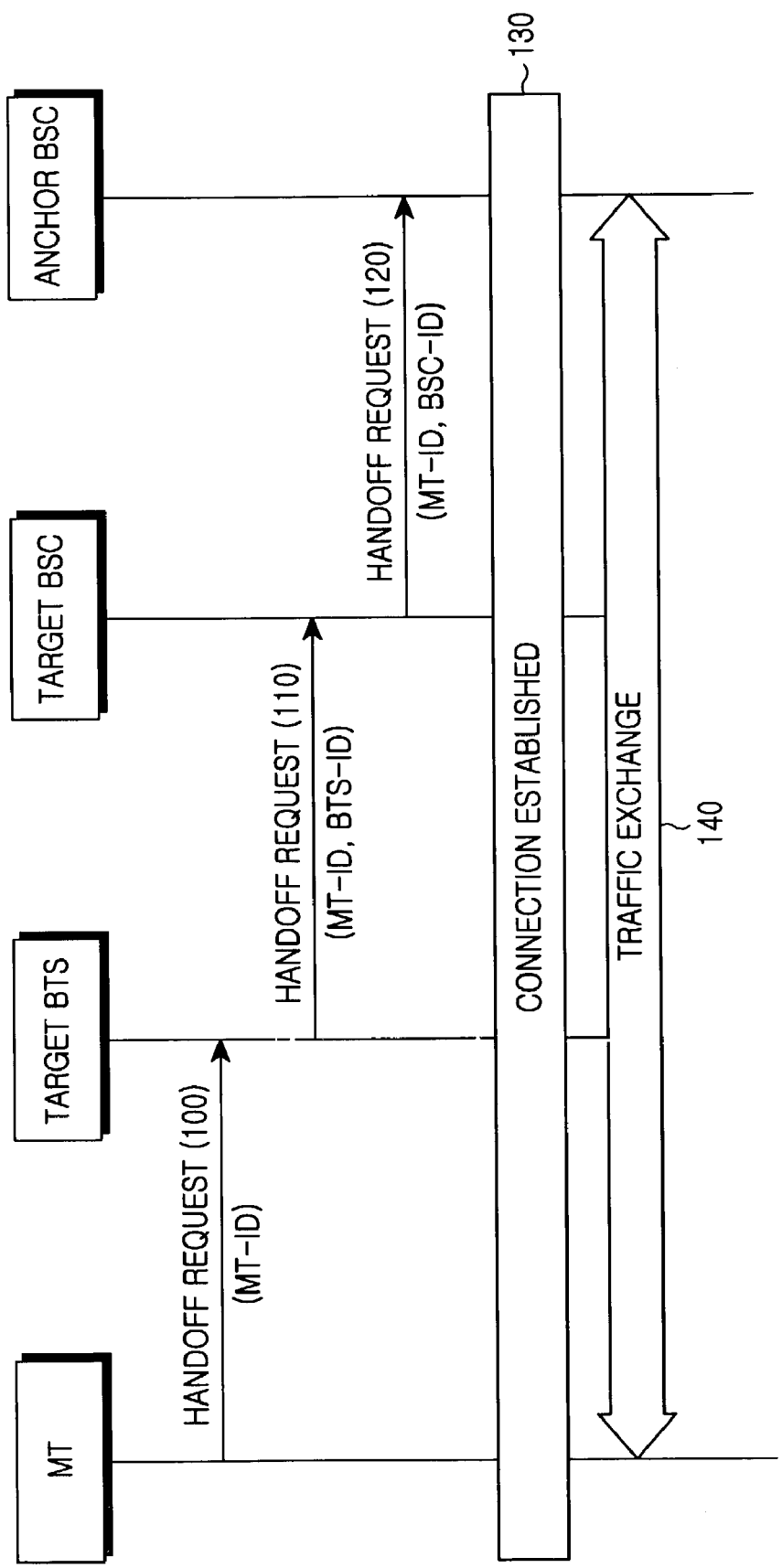
FIG. 4 is a diagram illustrating a signal flow for implementing an inter-BSC handoff in the conventional mobile communication system having the logical hierarchical network structure.
Figure 5:
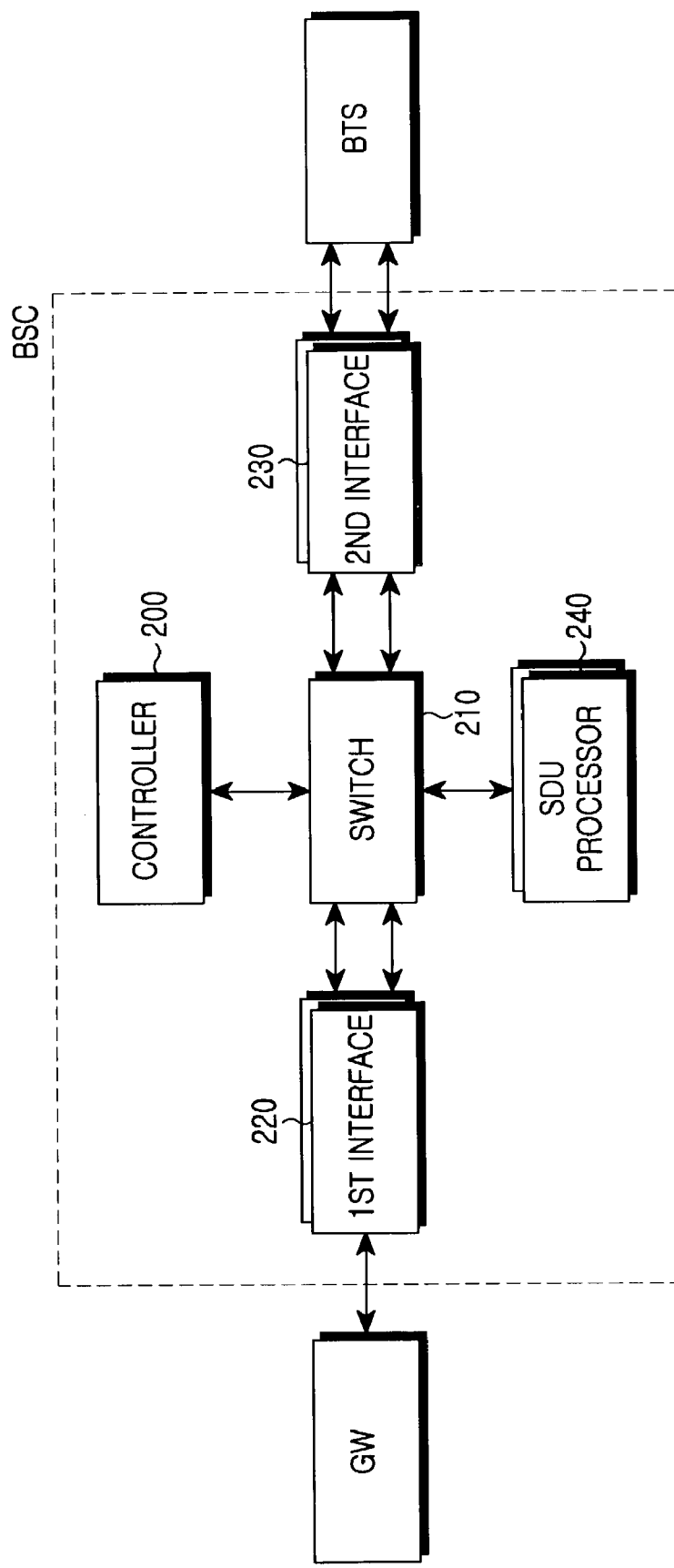
FIG. 5 is a block diagram of a BSC in a mobile communication system having a planar structure according to an embodiment of the present invention.

FIG. 5 is a block diagram of a BSC in a mobile communication system having a planar structure according to an embodiment of the present invention. Referring to FIG. 5, the BSC is connected to a GW (Gateway) and a BTS through a first interface 220 and a second interface 230, respectively. A controller 200 provides overall control to the BSC. An intra-BSC switch (or router) 210 routes traffic within the BSC. An SDU (Select and Distribute Unit) processor 240 multiplexes traffics to be transmitted on at least two radio links and demultiplexes traffics received on at least two radio links at a soft handoff.

Three embodiments of the present invention are contemplated to implement a soft handoff.

In an embodiment of the soft handoff, an MT transmits to its target BTS a Handoff Request message containing its ID and the ID of its anchor BSC and the target BTS in turn transmits to the anchor BSC a Handoff Request message containing its ID and the ID of the MT. Upon receipt of the Handoff Request message from the target BTS, the controller 200 or the SDU processor 240 in the anchor BSC controls traffic directed to the MT to be delivered to the target BTS. This will be described later with reference to FIG. 9.

In another embodiment of the soft handoff, a database having the IDs of MTs mapped to the IDs of their anchor BSC IDs is provided in a RAN. The database is continuously updated as the MTs roam. A target BTS requests the RAN to search for the anchor BSC of a specific MT in the database and upon detection of the anchor BSC, it transmits a Handoff Request message to the anchor BSC. Upon receipt of the Handoff Request message from the target BTS through the second interface 230, the controller 200 or the SDU processor 240 in the anchor BSC controls traffic directed to the MT to be delivered to the target BTS. This will be described later in more detail with reference to FIG. 10.

In a third embodiment of the soft handoff, IP (Internet Protocol) multicast is used. Upon receipt of a Handoff Request message from an MT, a target BTS searches for the anchor BSC of the MT by broadcasting a Search Request message to all nodes connected to a RAN. Upon receipt of the Search Request message through the second interface 230, the controller 200 or the SDU controller 240 in the anchor BSC transmits a Search Response message to the target BTS. Then the controller 200 or the SDU controller 240 receives a Handoff Request message from the target BTS through the second interface 230 and controls traffic directed to the MT to be delivered to the target BTS. This will be described later in more detail with reference to FIG. 11.

The above handoff methods can be realized with the use of corresponding separate devices. Alternatively, they can be implemented in software in the SDU processor of a BSC without imposing heavy loads on processing and requiring a large-capacity memory.

Figure 6:
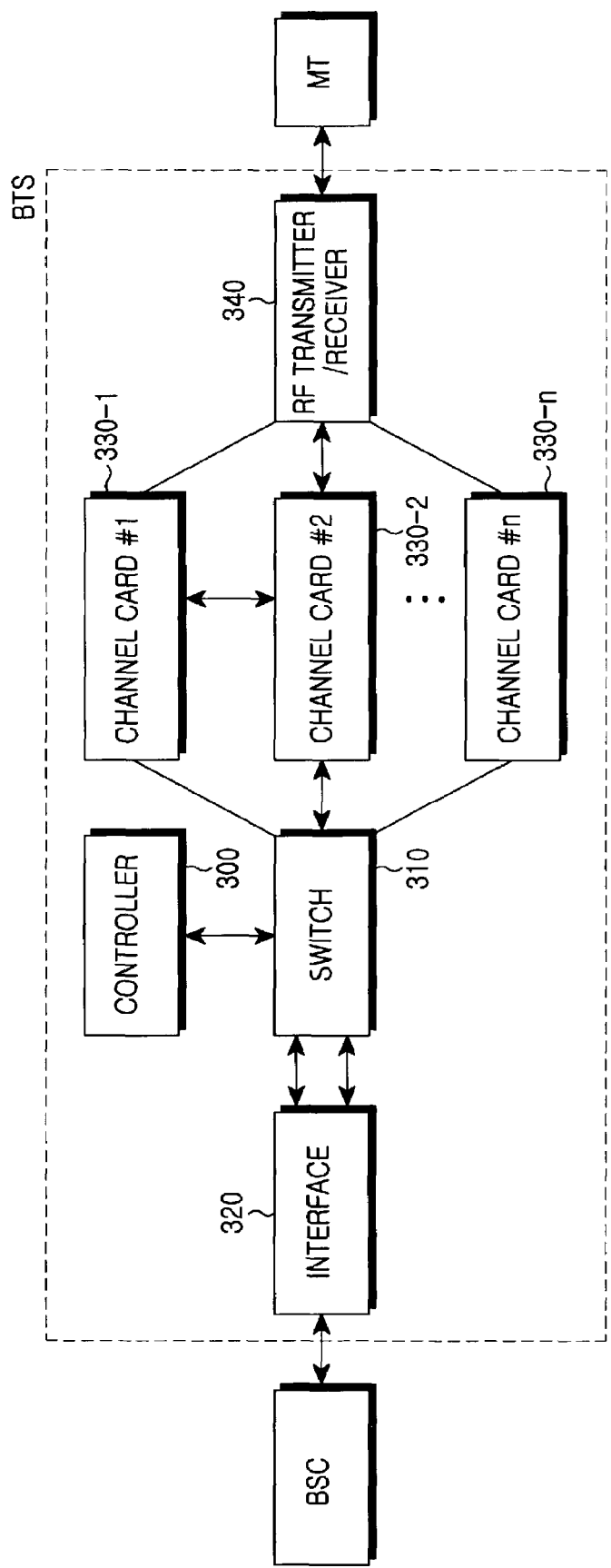
FIG. 6 is a block diagram of a BTS in the mobile communication system having a planar structure according to the embodiment of the present invention.

FIG. 6 is a block diagram of a BTS in the mobile communication system having a planar structure according to the embodiment of the present invention. Referring to FIG. 6, the BTS is connected to a BSC through an interface 320. Since the BTS is wirelessly connected to an MT, it includes an RF (Radio Frequency) transmitter/receiver 340. A controller 300 provides overall control to the BTS and an intra-BTS switch (or router) 310 determines a traffic path within the BTS. A plurality of channel cards 330-1 to 330-n are interposed between the intra-BTS switch 310 and the RF transmitter/receiver 340.

The operations of the BTS in the three handoff methods are performed with the use of corresponding separate devices. Alternatively, they can be implemented in software in the controller 300 without imposing heavy loads on processing and requiring a large-capacity memory.

Figure 7:
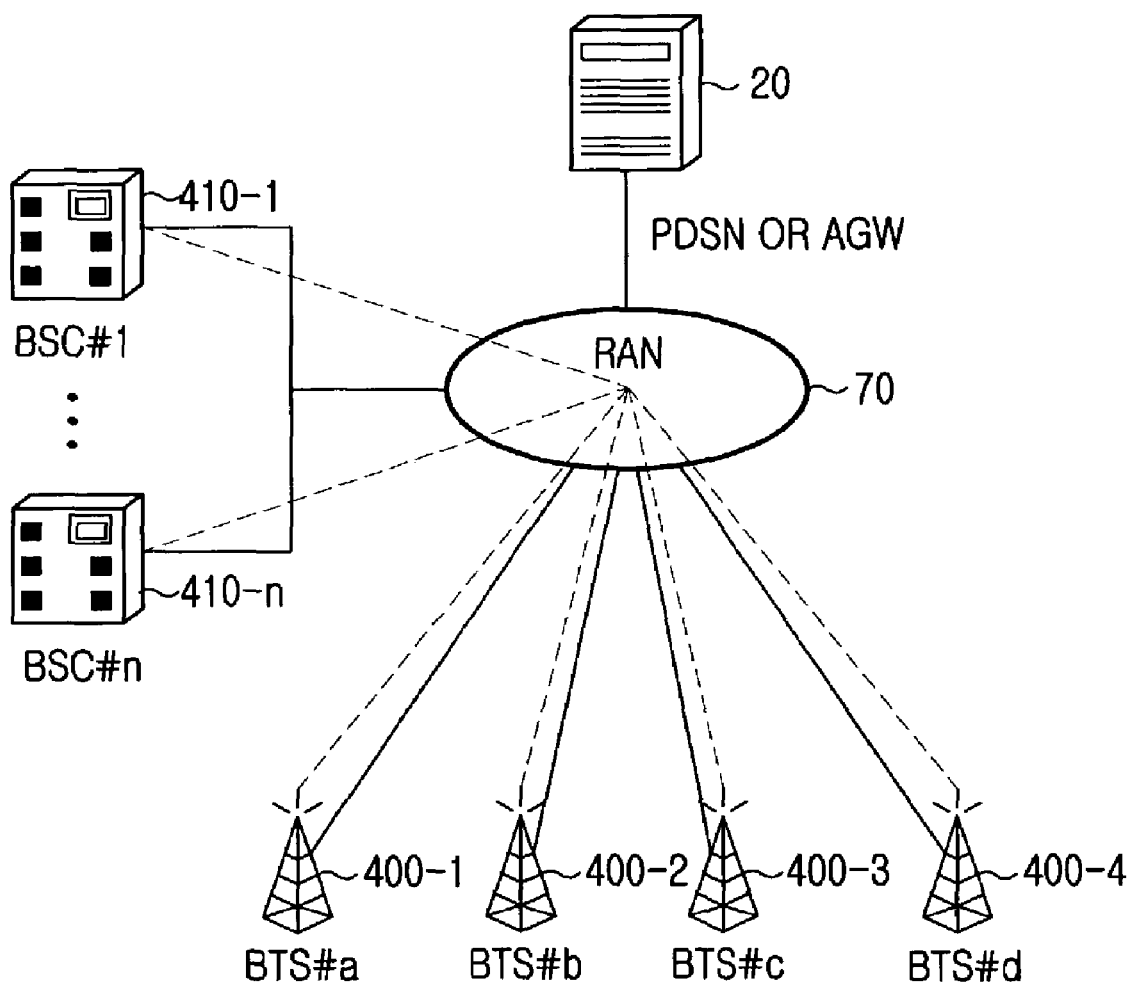
FIGS. 7 to 8C illustrate a network between BSCs and BTSs and data flows over the network in the mobile communication system having a planar structure according to the embodiment of the present invention.
Figure 8A:
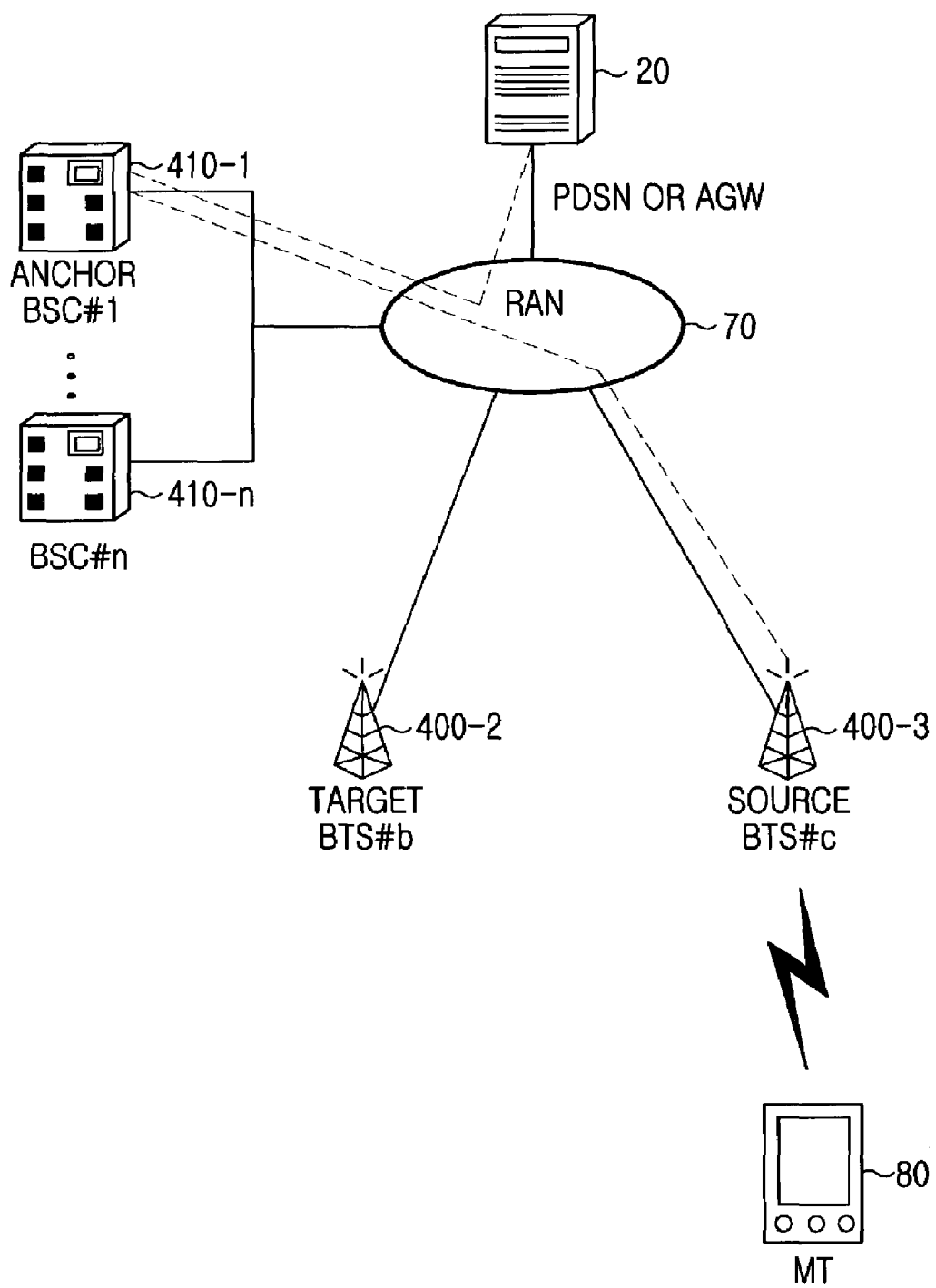
Figure 8B:
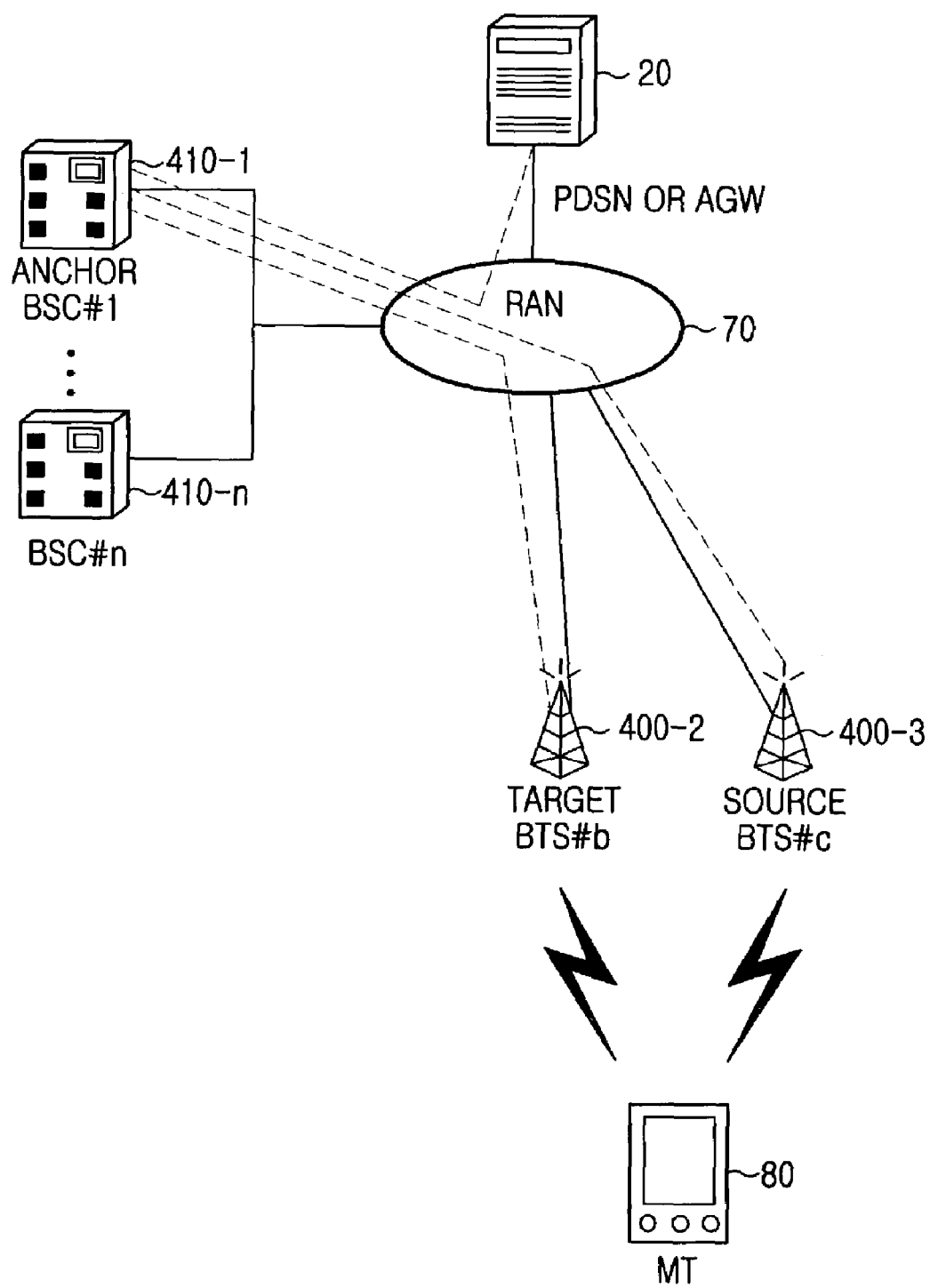
Figure 8C:
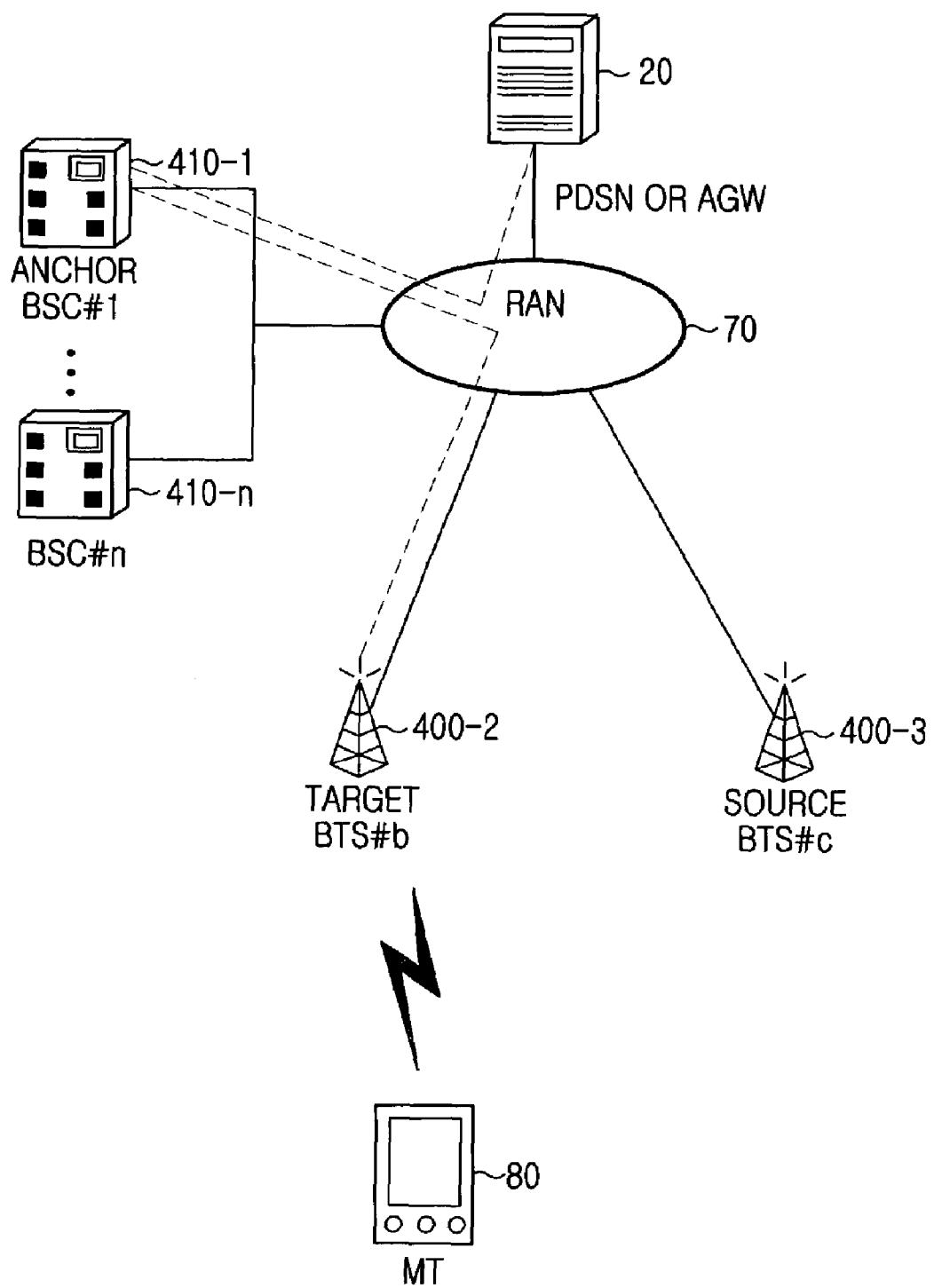

FIGS. 7 to 8C illustrate a network connecting BSCs to BTSs and data flows over the network in the mobile communication system according to the embodiment of the present invention.

Referring to FIGS. 7 to 8C, BTSs 400-1 to 400-4 each can be connected to a plurality of BSCs 410-1 to 410-n. In other words, each BTS can communicate with all BSCs through the RAN 70. Unlike the conventional network, BSCs are matched with BTSs not in a 1-to-N correspondence but in an N-to-M correspondence. To support this network structure, the BTSs and the BSCs must be configured as illustrated in FIGS. 5 and 6.

Before a handoff occurs, the MT 80 having a BSC #1 410-1 as its anchor BSC is connected to a source BTS #c 400-3 as illustrated in FIG. 8A. When the MT 80 moves to a target BTS #b 400-2, the target BTS #b 400-2 is directly connected to the anchor BSC #1 410-1 without the need for establishing a connection to its higher-layer BSC #n 410-n as illustrated in FIG. 8B, as compared to the conventional handoff method. During the handoff, the source BTS #c 400-3 is connected to the anchor BSC #1 410-1. Simultaneously a simple path between the target BTS #b 400-2 and the anchor BSC #1 410-1 is established for the MT 80.

When the handoff is completed as shown in FIG. 8C, the MT 80 is connected to the anchor BSC #1 410-1 through the target BTS #b 400-2. That is, the anchor BSC #1 410-1 is directly connected to the target BTS #b 400-2 where the MT 80 is located.

As described before, the three embodiments of a soft handoff can be implemented. Commonly, the target BSC #b 400-2 obtains the anchor BSC #1 410-1 of the MT 80.

Figure 9:
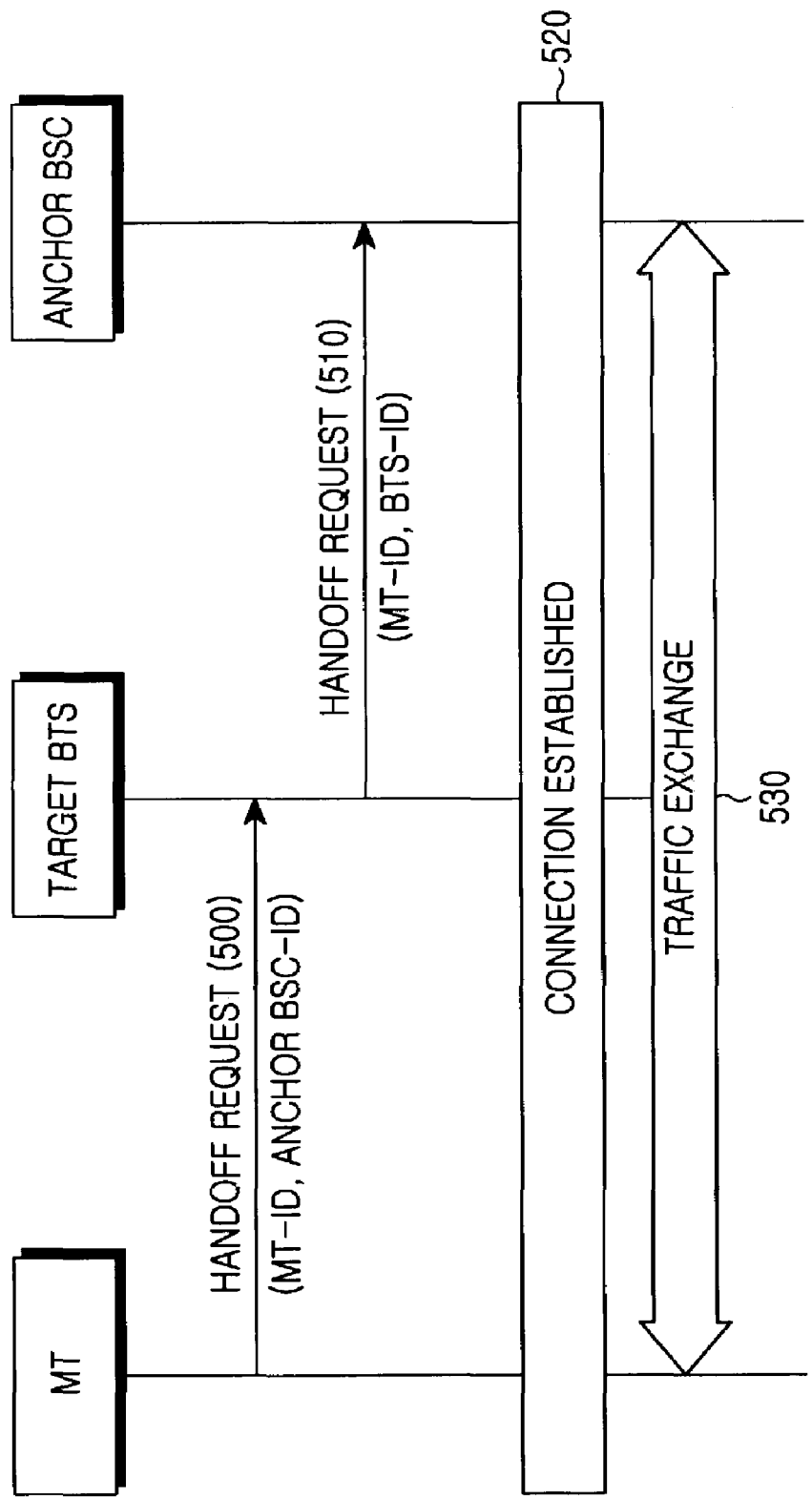
FIG. 9 is a diagram illustrating a signal flow for implementing an embodiment of a handoff according to the present invention.

FIG. 9 illustrates a signal flow for implementing an embodiment of a handoff according to the present invention. Referring to FIG. 9, the MT 80 transmits a Handoff Request message containing its ID and the ID of its anchor BSC #1 410-1 to the target BTS #b 400-2 in step 500. Then the target BTS #b 400-2 transmits a Handoff Request message containing its ID and the ID of the MT 80 to the anchor BSC #1 410-1. The anchor BSC #1 410-1 establishes related connections in step 520 and transmits traffic to the MT 80 through the target BTS #b 400-2. To perform the handoff, the MT 80 must know its anchor BSC #1 410-1.

Figure 10:
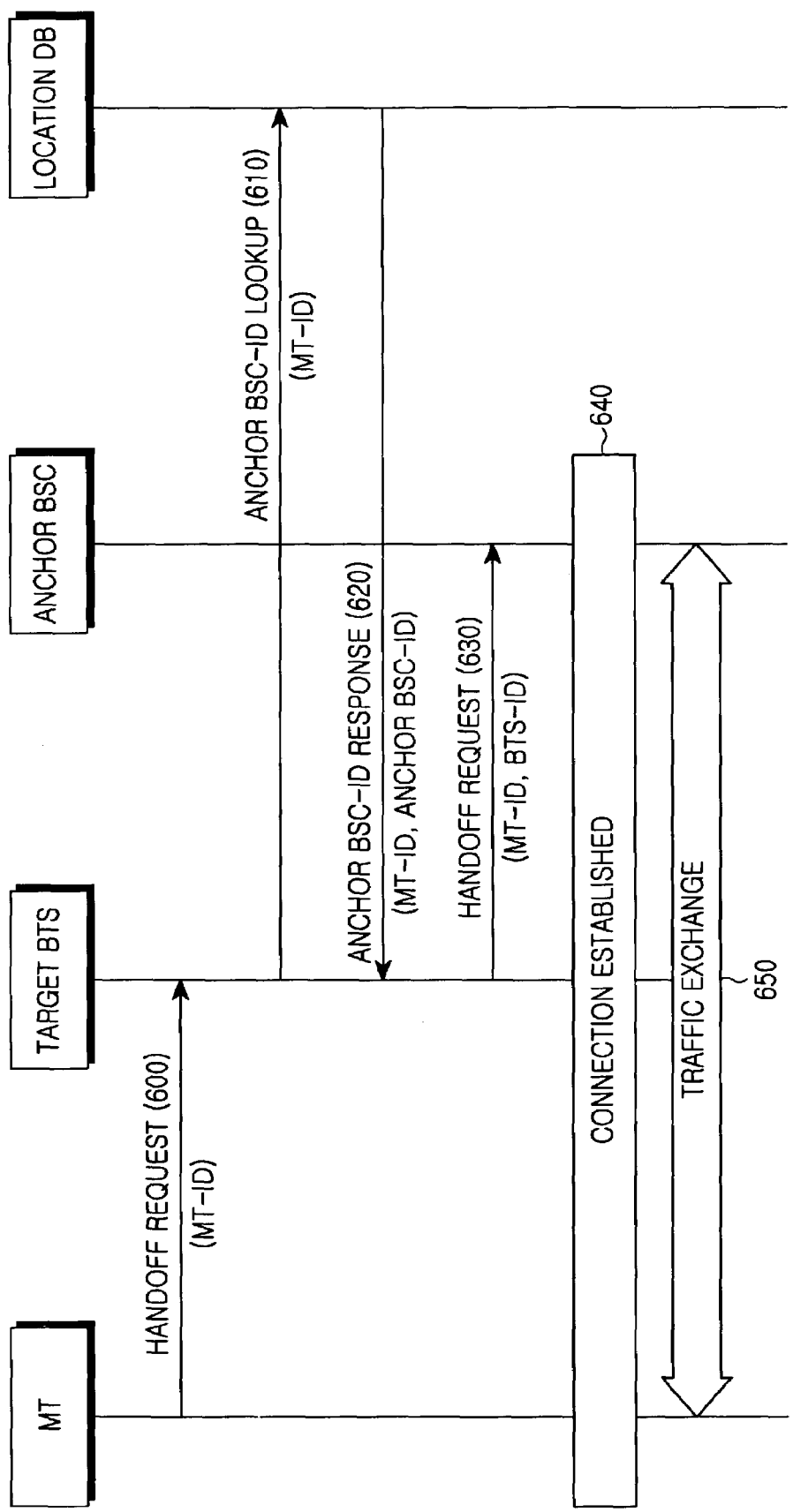
FIG. 10 is a diagram illustrating a signal flow for implementing another embodiment of the handoff according to the present invention.

FIG. 10 illustrates a signal flow for implementing another embodiment of the handoff according to the present invention. Referring to FIG. 10, the RAN 70 is provided with a location database having information about mapping of the IDs of MTs to the IDs of their anchor BSCs. Upon receipt of a Handoff Request message containing the ID of the MT 80 from the MT 80 in step 600, the target BTS #b 400-2 transmits an Anchor BSC-ID Lookup message containing the ID of the MT 80 to the location database in step 610 and the location database transmits an Anchor BSC-ID Response message containing the ID of the anchor BSC #1 410-1 to the target BTS #b 400-2 in step 620. Thus, the target BTS #b 400-2 requests a connection to the anchor BSC #1 410-1 in step 630. Then the anchor BSC #1 410-1 establishes a connection to the target BTS #b 400-2 in step 640 and exchanges traffic with the MT 80 in step 650.

Figure 11:
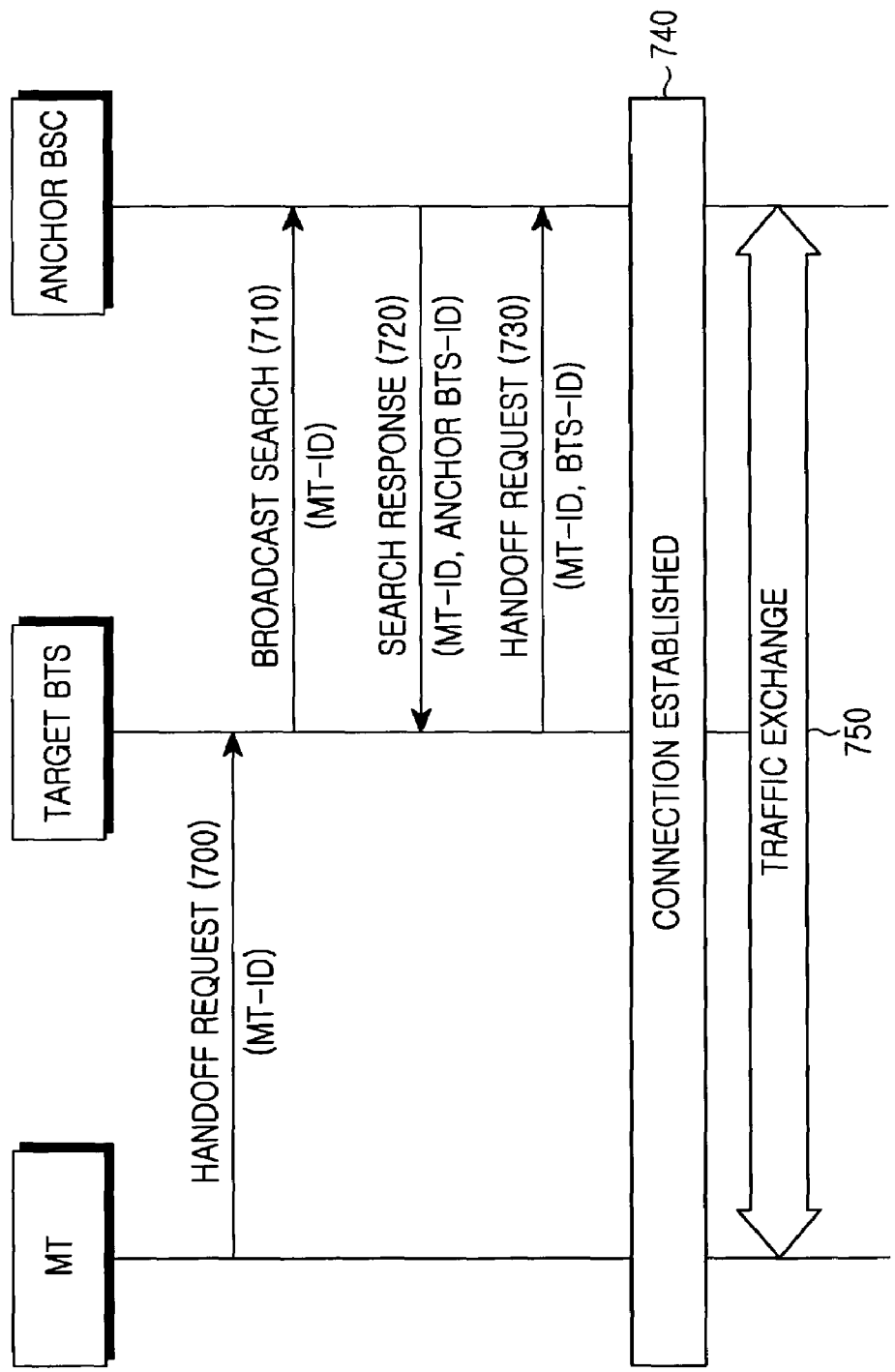
FIG. 11 is a diagram illustrating a signal flow for implementing a third embodiment of the handoff according to the present invention.

FIG. 11 illustrates a signal flow for performing a third embodiment of the handoff according to the present invention.

Referring to FIG. 11, upon receipt of a Handoff Request message from the MT 80 in step 700, the target BTS #b 400-2 broadcasts a Broadcast Search message for detecting an anchor BSC managing the MT 80 over the RAN 70 in step 710. Then the anchor BSC #1 410-1 transmits a Search Response message containing its ID to the target BTS #b 400-2 in step 720. The target BTS #b 400-2 transmits a Handoff Request message containing its ID and the ID of the MT 80 to the anchor BSC #1 410-1 in step 730. Steps 740 and 750 are performed in the same manner as in the procedures of FIGS. 9 and 10.

Table 1, Table 2 and Table 3 illustrate messages used in the procedures illustrated in FIGS. 9, 10 and 11.

Table 1 below lists fields common to the Handoff Request message directed from the MT to the target BTS in FIGS. 10 and 11, the Anchor BSC-ID Lookup message in FIG. 10, and the Broadcast Search message in FIG. 11.

TABLE 1

MSG HEADER
CONTROL FIELD
MT-ID
MSG TRAILER

Table 2 below lists fields of the Handoff Request message directed from the target BTS to the anchor BSC in FIGS. 9, 10 and 11.

TABLE 2

MSG HEADER
CONTROL FIELD
MT-ID
BTS-ID
MSG TRAILER

Table 3 below lists fields of the Handoff Request message directed from the target BTS to the anchor BSC in FIG. 9, the Anchor BSC-ID Response message in FIG. 10, and the Search Response message in FIG. 11.

TABLE 3

MSG HEADER
CONTROL FIELD
MT-ID
BSC-ID
MSG TRAILER

As described above, the handoff methods according to the present invention have the benefits of efficient use of RAN capacity, fast handoff, and reduction of a data delay by half.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for implementing a handoff for an MT (Mobile Terminal) in a mobile communication system in which at least two BSCs (Base Station Controllers) are connected to at least two BTSs (Base Transceiver Systems) through a RAN (Radio Access Network) having a planar structure, each of the BSCs controls at least one BTS, and each of the BTSs as a source BTS provides information about an anchor BSC that is serving a call to an MT at a call setup, comprising the steps of:

storing anchor BSC information received from a source BTS at a call setup;

transmitting to a target BTS a first Handoff Request message including the anchor BSC information, a message header, a message trailer, a control field, and MT identification, when a handoff is requested; and processing a call through the target BTS upon receipt from the target BTS of a response signal; and transmitting, by the anchor BSC, a data to the target BTS, when the anchor BSC receives a second Handoff Request message including MT and BTS identifications, a message header, a message trailer, and a control field.

2. A method for implementing a handoff for a target BTS (Base Transceiver System) in a mobile communication system in which at least two BSCs (Base Station Controllers) are connected to at least two BTSs through a RAN (Radio Access Network) having a planar structure, each of the BSCs controls at least one BTS, and each of the BTSs as a source BTS provides information about an anchor BSC that is serving a call to an MT (Mobile Terminal) at a call setup, comprising the steps of:

transmitting to the anchor BSC of an MT a second Handoff Request message containing information about an MT, a message header, a message trailer, a control field. and information about the target BTS upon receipt from the MT, of a first Handoff Request message containing information about the anchor BSC, a message header, a message trailer, and a control field; and forwarding traffic data to the MT upon receipt of the traffic data directed to the MT from the anchor BSC, wherein said handoff bypasses a target BSC during handoff messaging.

3. A method for implementing a handoff for an anchor BSC that is serving a call to an MT (Mobile Terminal) in a mobile communication system in which at least two BSCs (Base Station Controllers) are connected to at least two BTSs (Base Transceiver Systems) through a RAN (Radio Access Network) having a planar structure, each of the BSCs controls at least one BTS, and each of the BTSs as a source BTS provides information about the anchor BSC of an MT at a call setup, comprising the step of:

releasing a channel connected to a source BTS and establishing the channel to a target BTS for an MT to which the anchor BSC is serving a call upon receipt of a second Handoff Request message containing information about the target BTS and information about the MT, a message header, a message trailer, and a control field, wherein said handoff bypasses a target BSC during handoff messaging.

4. A handoff method among a source BTS (Base Transceiver System), a target BTS, and an anchor BSC (Base Station Controller) for transmitting a traffic signal to the source BTS in a mobile communication system in which at least two BSCs are connected to at least two BTSs through a RAN (Radio Access Network) having a planar structure, comprising the steps of:

transmitting a first Handoff Request message containing information about an MT (Mobile Terminal), a message header, a message trailer, a control field, and information about the anchor BSC from the MT to the target BTS when the MT moves to a handoff zone;

transmitting a second Handoff Request message containing the MT information, a message header, a message trailer, a control field, and information about the target BTS from the target BTS to the anchor BSC upon receipt of the first Handoff Request message; and transmitting a traffic signal directed to the MT from the anchor BSC to the target BTS upon receipt of the second Handoff Request message, wherein said handoff bypasses a target BSC during handoff messaging.

5. A handoff method among a source BTS (Base Transceiver System), a target BTS, and an anchor BSC (Base Station Controller) for transmitting a traffic signal to the source BTS in a mobile communication system in which at least two BSCs are connected to at least two BTSs through a RAN (Radio Access Network) having a planar structure having a database of information about anchor BSCs for MTs (Mobile Terminals) communicating with BTSs, comprising the steps of:

transmitting from the MT to the target BTS a first Handoff Request message containing information about an MT, a message header, a message trailer, and a control field, when the MT moves to a handoff zone;

detecting by the target BTS the anchor BSC of the MT from the database upon receipt of the first Handoff Request message;

transmitting to the anchor BSC a second Handoff Request message containing information about the target BTS, a message header, a message trailer, a control field, and the MT information from the target BTS; and transmitting a traffic signal directed to the MT from the anchor BSC to the target BTS upon receipt of the second Handoff Request message, wherein said handoff bypasses a target BSC during handoff messaging.

6. A handoff method among a source BTS (Base Transceiver System), a target BTS, and an anchor BSC (Base Station Controller) for transmitting a traffic signal to the source BTS in a mobile communication system in which at least two BSCs are connected to at least two BTSs through a RAN (Radio Access Network) having a planar structure, comprising the steps of:

transmitting from the MT to the target BTS a first Handoff Request message containing information about an MT, a message header, a message trailer, and a control field, when the MT moves to a handoff zone;

broadcasting a Search Request message for searching by the target BTS for the anchor BSC of the MT over the RAN having a planar structure upon receipt of the first Handoff Request message;

transmitting from the target BTS to the anchor BSC a second Handoff Request message containing information about the target BTS, a message header, a message trailer, a control field, and the MT information upon receipt of a Search Response message indicating the anchor BSC over the RAN having a planar structure; and transmitting a traffic signal directed to the MT from the anchor BSC to the target BTS upon receipt of the second Handoff Request message, wherein said handoff bypasses a target BSC during handoff messaging.

7. A system for implementing a handoff in a mobile communication system in which at least two BSC (Base Station Controllers) are connected to at least two BTSs (Base Transceiver Systems) through a RAN (Radio Access Network) having a planar structure, comprising:

an MT (Mobile Terminal) for transmitting to a target BTS a first Handoff Request message containing information about the MT, a message header, a message trailer, a control field, and information about an anchor BSC of the MT when the MT moves to a handoff zone;

the target BTS for transmitting to the anchor BSC a second Handoff Request message containing the MT information, a message header, a message trailer, a control field, and information about the target BTS upon receipt of the first Handoff Request message, and providing a traffic service to the MT when a handoff is completed; and the anchor BSC for transmitting a traffic signal directed to the MT to the target BTS over the RAN having a planar structure upon receipt of the second Handoff Request message, wherein said handoff bypasses a target BSC during handoff messaging.

8. A system for implementing a handoff in a mobile communication system in which at least two BSC (Base Station Controllers) are connected to at least two BTSs (Base Transceiver Systems) through a RAN (Radio Access Network) having a planar structure, comprising:

an MT (Mobile Terminal) for transmitting to a target BTS a first Handoff Request message containing information about the MT, a message header, a message trailer, and a control field, when the MT moves to a handoff zone;

a database connected to the RAN having a planar structure, for storing information about an anchor BSC that serves the MT and providing the anchor BSC information upon request;

the target BTS for requesting the database to search for the anchor BSC of the MT using the MT information upon receipt of the first Handoff Request message, transmitting to the anchor BSC a second Handoff Request message containing information about the target BTS, a message header, a message trailer, a control field, and the MT information when the target BTS obtains the anchor BSC information from the database, and providing a traffic service to the MT when a handoff is completed; and the anchor BSC for transmitting a traffic signal directed to the MT to the target BTS over the RAN having a planar structure upon receipt of the second Handoff Request message, wherein said handoff bypasses a target BSC during handoff messaging.

9. A system for implementing a handoff in a mobile communication system in which at least two BSC (Base Station Controllers) are connected to at least two BTSs (Base Transceiver Systems) through a RAN (Radio Access Network) having a planar structure, comprising:

an MT (Mobile Terminal) for transmitting to a target BTS a first Handoff Request message containing information about the MT, a message header, a message trailer, and a control field, when the MT moves to a handoff zone;

the target BTS for broadcasting a Search Request message for searching for an anchor BSC of the MT over the RAN having a planar structure upon receipt of the first Handoff Request message, transmitting to the anchor BSC a second Handoff Request message containing information about the target BTS, a message header, a message trailer, a control field, and the MT information upon receipt of a Search Response message indicating the anchor BSC over the RAN having a planar structure, and providing a traffic service to the MT when a handoff is completed; and the anchor BSC for transmitting a traffic signal directed to the MT to the target BTS upon receipt of the second Handoff Request message, wherein said handoff bypasses a target BSC during handoff messaging.

* * * * *